UNITED STATES PATENT OFFICE.

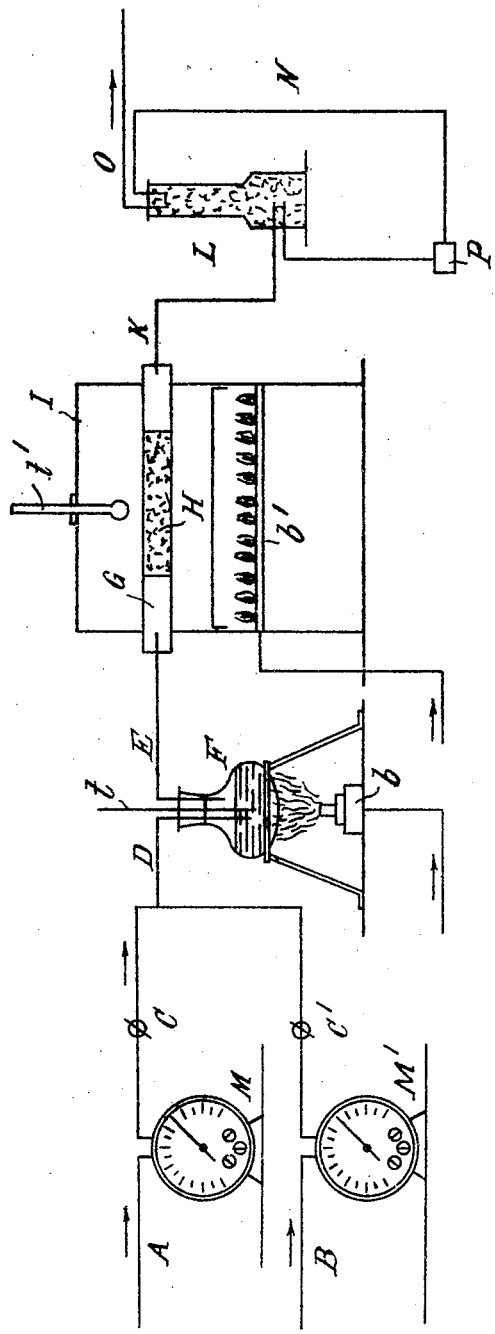

HERMAN CHARLES WOLTERECK, OF LONDON, ENGLAND, ASSIGNOR TO THE CHEMICALS PROPRIETARY COMPANY, LIMITED, OF LONDON, E. C., ENGLAND.

PROCESS OF MAKING AMMONIA BY SYNTHESIS.

No. 803,652.   Specification of Letters Patent.   Patented Nov. 7, 1905.

Application filed May 4, 1903. Serial No. 155,653.

*To all whom it may concern:*

Be it known that I, HERMAN CHARLES WOLTERECK, consulting chemist, a citizen of the United States, residing at 16 Ashley Place, London, S. W., England, have invented a certain new and useful Process of Producing Ammonia by Synthesis, of which the following is a specification.

I am aware that the synthesis of ammonia has been attempted by many previous investigators. The direct combination of the constituent elements of ammonia has been effected by the agency of electrical discharges, and nitrogen and hydrogen have been passed over iron-filings or reduced iron heated to a dark-red heat with formation of ammonia. The formation of ammonia by this last-mentioned method, however, soon ceases, and the careful investigations which I have made have proved to me that as soon as the iron ceases to contain traces of oxid of iron the formation stops. The process which I have derived from this observation is described in my application for Letters Patent of the United States, Serial No. 120,110, filed August 18, 1902. In the further elaboration of this process I have found that if air and steam only heated to a temperature between 300° and 400° centigrade, and preferably to 350° centigrade, are passed over iron (or other suitable element) offering a large surface and intimate contact ammonia is formed in considerable quantities, while the iron, &c., is oxidized. It is preferable that the iron or other contact material should also be heated to the temperature required to prevent loss of action by cooling. The formation of ammonia decreases with the progress of the oxidation of the contact material; but I have found it possible to hold the oxidation in check by the admixture of a small quantity of a reducing-gas, such as carbon monoxid or hydrogen or of gases containing either or both of same, to the air and steam used, and to thus insure the continuity of the process. The gases may be mixed prior to their entering the reaction tube or chamber containing the iron, (or other suitable metal,) or they may be separately introduced and allowed to mix in the reaction tube or chamber itself. The air and reducing-gas may be first passed and the steam afterward over the iron or other suitable metal. Any oxygen-carrier metal is a suitable metal, and although iron has yielded the best results I have got almost as good results with bismuth and chromium.

The proportions of air and steam may vary within great limits without affecting the operation of the process. The percentage of steam should, however, be kept down as low as possible for economical reasons.

The process described may be executed in the laboratory by means of the apparatus illustrated in the schematical view accompanying this specification, in which A is the air-pipe admitting air through the gas-meter M and the precision-cock C through D, passing into the water contained in the flask F, which is heated by the gas-burner $b$, the temperature being controlled by the thermometer $t$. The air now charged with moisture passes through E into the reaction tube or chamber G, containing the contact material H, consisting of small pieces of wire-gauze, where the reaction and formation of ammonia takes place. Tube G is placed into the air-oven I, where it is heated to the temperature required by means of the small gas-burners $b'$, the temperature being controlled by thermometer $t'$. The gases escape through K into the absorption-tower L, which is filled with broken pumice or similar material, over which acid is being circulated through pipe N by means of the small pump P. The ammonia produced in the process is fixed by the acid in L, and the exhaust-gases escape through O. Carbon monoxid or hydrogen is admitted through tube B, carefully measured in the gas-meter M' and regulated through the precision-cock C', meeting the current of air at the entrance of tube D and being thoroughly mixed with it while passing through the water contained in flask F.

Having now particularly described and ascertained the nature of my said invention and in what manner the same is to be performed, I declare that what I claim is—

1. The process for the synthetical production of ammonia consisting in passing air and steam, and a reducing-gas, heated to a temperature between 300° and 400° centigrade and preferably to about 350° centigrade over iron offering a large surface and intimate contact and preferably heated to the same temperature.

2. The process for the synthetical production of ammonia consisting in alternately passing air together with a small quantity of a reducing-gas, and steam, all heated to a temperature between 300° and 400° centigrade and preferably to about 350° centigrade over iron offering a large surface and intimate contact, and preferably also heated to the same temperature.

In testimony whereof I affix my signature in presence of two witnesses.

HERMAN CHARLES WOLTERECK.

Witnesses:
EDWARD WILLIAM COX,
ANNIE FLORENCE RICHARDSON.